United States Patent [19]
Dory

[11] 4,012,952
[45] Mar. 22, 1977

[54] ULTRASONIC SYSTEM
[75] Inventor: Jacques Dory, Meaux, France
[73] Assignee: Realization Ultrasoniques, France
[22] Filed: Nov. 21, 1974
[21] Appl. No.: 525,751
[30] Foreign Application Priority Data
Nov. 22, 1973 France ............................ 73.41921
[52] U.S. Cl. ............................ 73/67.7; 73/67.8 R; 73/67.9
[51] Int. Cl.² ........................................ G01N 29/00
[58] Field of Search .......... 73/67.7, 67.8 R, 67.8 S, 73/67.9, 67.5, 70

[56] References Cited
UNITED STATES PATENTS

| | | | |
|---|---|---|---|
| 3,349,609 | 10/1967 | Ryzhov-Nikonov et al. | 73/67.9 |
| 3,384,767 | 5/1968 | Arnold et al. | 73/67.5 |
| 3,789,833 | 2/1974 | Bom | 73/67.7 |
| 3,820,387 | 6/1974 | Grabendorfer et al. | 73/67.9 |

Primary Examiner—Richard E. Aegerter
Assistant Examiner—Willis Little
Attorney, Agent, or Firm—William A. Drucker

[57] ABSTRACT

An ultrasonic probing system including: a recurrent electric impulse sender, several transducer devices integral with a common support and connected to said sender; receptor devices connected with said sender, wherein the transducer devices are arranged to include focal areas which together cover an extended area essentially perpendicular to the common support and the connection between the transducer and receptor devices includes means for introducing a variable transfer characteristic; and programming devices controlling said introducing means in order to cause said characteristic to vary as a function of the elapsed time after transmission of each electrical impulse whereby the system operates with an effective focal spot coinciding at each probing instant with the tested area.

5 Claims, 4 Drawing Figures

ULTRASONIC SYSTEM

This invention relates to an ultrasonic probing system including: a recurrent electric impulse sender, several transducer devices integral with a common support and connected to said sender; receptor devices connected with each sender, characterized in that the transducer devices are arranged to include focal areas which together cover an extended area essentially perpendicular to the common support and the connection between the transducer and receptor devices includes means for introducing a variable transfer characteristic; and programming device controlling said introducing means in order to cause said characteristic to vary as a function of the elapsed time after transmission of each electrical impulse.

By suitable programming it is possible, as will be further explained, to obtain an operation equivalent to that of a transducer having a movable focal spot at a velocity such that at each probing instant the focal spot coincides with the tested area.

The area tested at any given instant is obviously that located at a distance from the active surface of the transducer such that the round trip propagation time of ultrasounds from the active transducer surface to this area is equal to the time lapse separating the sending impulse from the instant under consideration.

If there is an obstacle that reflects in this area, the focal area will thus coincide with this obstacle and a high-resolution image of the obstacle will thus be obtained.

An example of the invention concerns echo recording devices, intended for examination of biological tissue. When the image is obtained by scanning the examined volume with an ultrasonic beam from a mobile probe, it is obvious that its resolution depends essentially on the sharpness of the beam. This sharpness is a function of the geometric characteristics of the probe and the working frequency. Taking into account the high absorption presented by biological tissue, this cannot in practice exceed 2 or 3 MHz. Under these conditions, the classic single probe procedure does not produce, even by giving the active surface of the probe e.g. the shape of a spheric cap, a sharp focus of the beam on a sufficient length, so that images obtained lack resolution.

Based upon the invention, the quality of performance of these devices can be considerably increased.

One can anticipate obtaining the equivalent of a movable focal spot transducer by using a plurality of non-focusing transducer devices and by connecting such transducers to receptor devices through delay lines and introducing programmable phase-shifts on the echos. This solution is difficult to implement in practice when one wants to examine areas very close to the probe. Actually, as the relationship between the dimension of the multiple probe and the distance of focal lines becomes large, the phase-shift must vary very rapidly and sizeably and it is technologically very difficult to assure the precision required in the phase-shifts.

The solution which is the subject of the invention obviously does not include this difficulty. On the other hand, since focusing at a given point is obtained solely by switching transducer elements or couples of transducer elements having an appropriate geometry, one cannot obtain a continuous variation of the focal distance, and the accuracy of this method is thus relatively limited.

Following a preferred mode of the invention, the system further includes means to cause different delays of the echoes received from the various transducer elements and means for programming such delays as a function of time to obtain a sharper variation of the displacement of the mobile focusing spot obtained thanks to the focusing effect resulting from the arrangement and switching of the transducers.

The invention will be better understood by using the following description:

IN THE DRAWING

Figure 1:
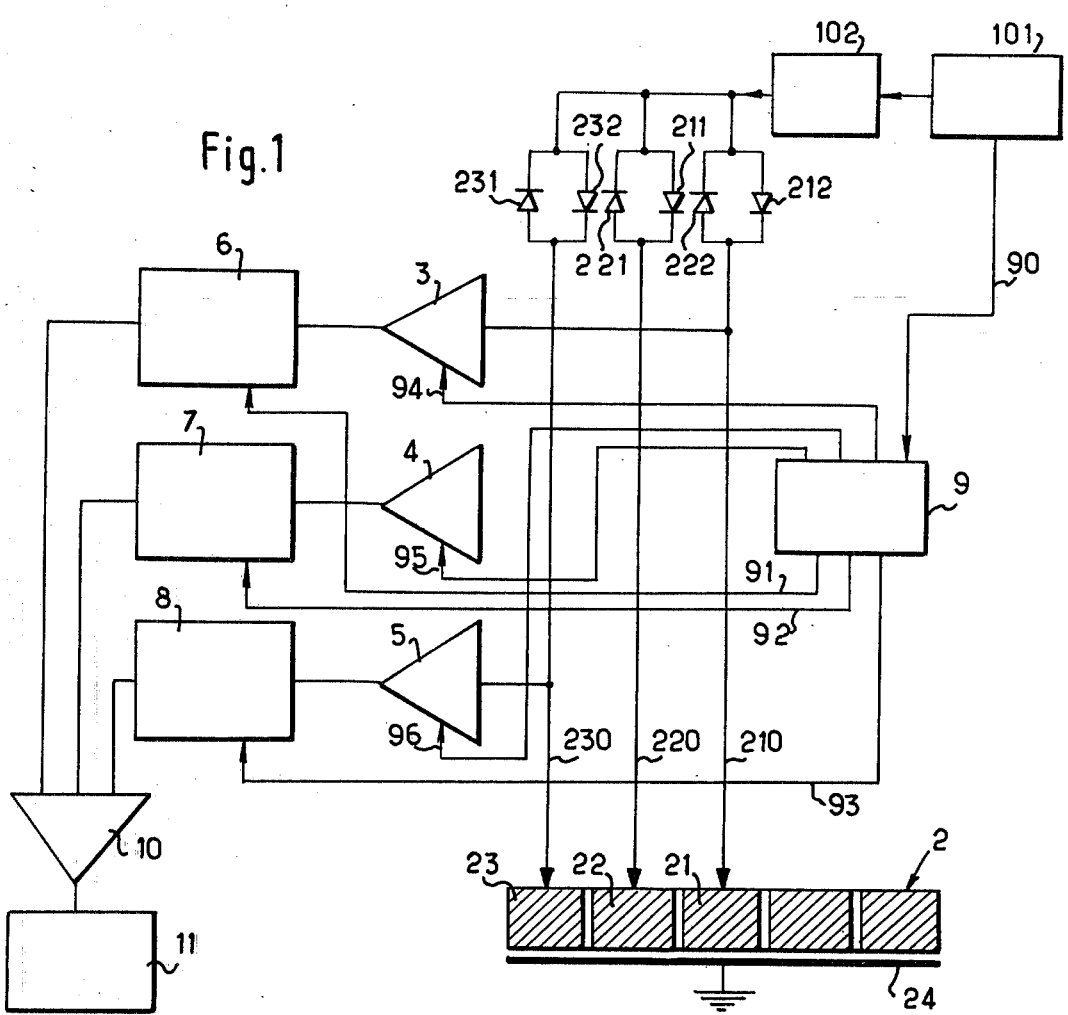
FIG. 1 is the basic schematic diagram of an ecographic device consistent with a mode of implementation of the invention.

The device of FIG. 1 includes a sender of recurrent electric impulses 102 synchronized by a generator 101 and energizing a multiple-element probe 2, reception amplifiers such as 3, 4 and 5, respectively, followed by variable delay lines 6, 7 and 8. The delay variation and the gain of amplifiers 3 through 5 are controlled by a programming device 9, in the manner explained hereinafter.

A circuit 10 gives the algebraic sum (or, alternately, the product) of the delay line output signals, and is connected to a result display device. The latter may be, e.g., an oscillograph, a TV screen display circuit or other known devices, expressed, for diagrammatic simplicity, by a rectangle 11.

Figure 2:
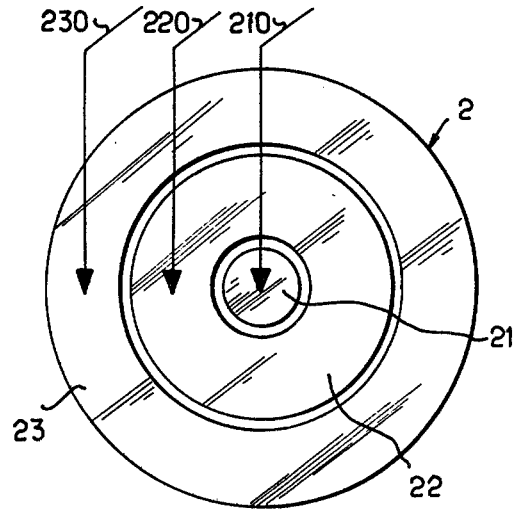
FIG. 2 is a diagrammatic plan view of the multiple transducer.

The probes, FIGS. 1 and 2, are made of concentric ring elements, such as 21, 22 and 23, electrically insulated from each other (but having a common mass electrode 24) and separately energized through circuits, each including two parallel beak-head mounted diodes: i.e. 211–212, 221–222 and 231–232, respectively. The energizing wires 210–220–230 are directly hooked up to the amplifiers 3–4–5. On output the impulses have an amplitude sufficient for the diodes to be practically short-circuited, whereas on reception the amplitude impulses below diode threshold are not transmitted to the sender.

The piezoelectric elements 21–22–23 are e.g. obtained by cutting of a ceramic disc, an insulating material being thereafter fitted into separation grooves between elements. Various other embodiments are possible, the essential characteristic being that the elements should be piezoelectrically insulated from each other.

Figure 3:
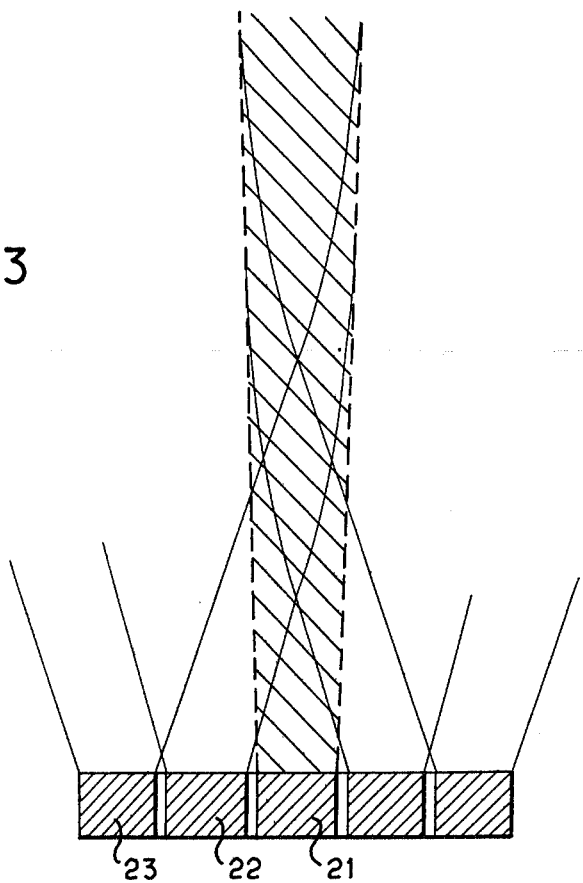
FIG. 3 shows the radiation diagram of such a transducer.

FIG. 3 shows that by suitable choice of the elements of rings sizes it is possible to obtain a recovery of the focal spots leading, for the probe, to a focal area perpendicularly lengthened with respect to the probe (scratched figure). One can see that the central element 21 has an almost cylindrical focal area, whereas the median and exterior elements 23 have focal areas, the axial torque of which results from the intersection of two surfaces flared in relation to the size of the ring element's diameter. It appears that the focal areas of concentric rings of growing diameters are located at increasing distances from the probe.

It will be generally necessary, in practice, to utilize more than three elements in order to obtain satisfactory focusing.

Although the ring form shown is the preferred mode of implementation of the invention, other forms may be used: for instance, one may use a linear probe having about ten juxtaposed elements, or elements cut from a single element. Polarization is done after machining, in order to maintain maximum piezoelectric qualities. The grooves must have a width of the order of 1/10 mm maximum, to reduce deviation effects due to the network made up by the grooves. A slight sloping of the grooves may be adopted for the same purpose.

A plastic lens is advantageously glued to the active face of each element, to correct its radiation diagram.

The elements are energized in parallel at the output, but the corresponding echoes are transmitted to receptor 10 following a program determined by device 9. The latter at any given instant governs the gain of amplifiers 3 through 5 so that the elements are successively linked to the receptors in the order of their increasing diameters, between the time of output of each impulse and a time corresponding to the round trip propagation time of the impulses on the maximum scanning distance. On the other hand, the echoes corresponding to the various elements are delayed by different amounts by delay lines 6–7–8, the delays of which are programmed as a function of time by means of device 9.

Figure 4:
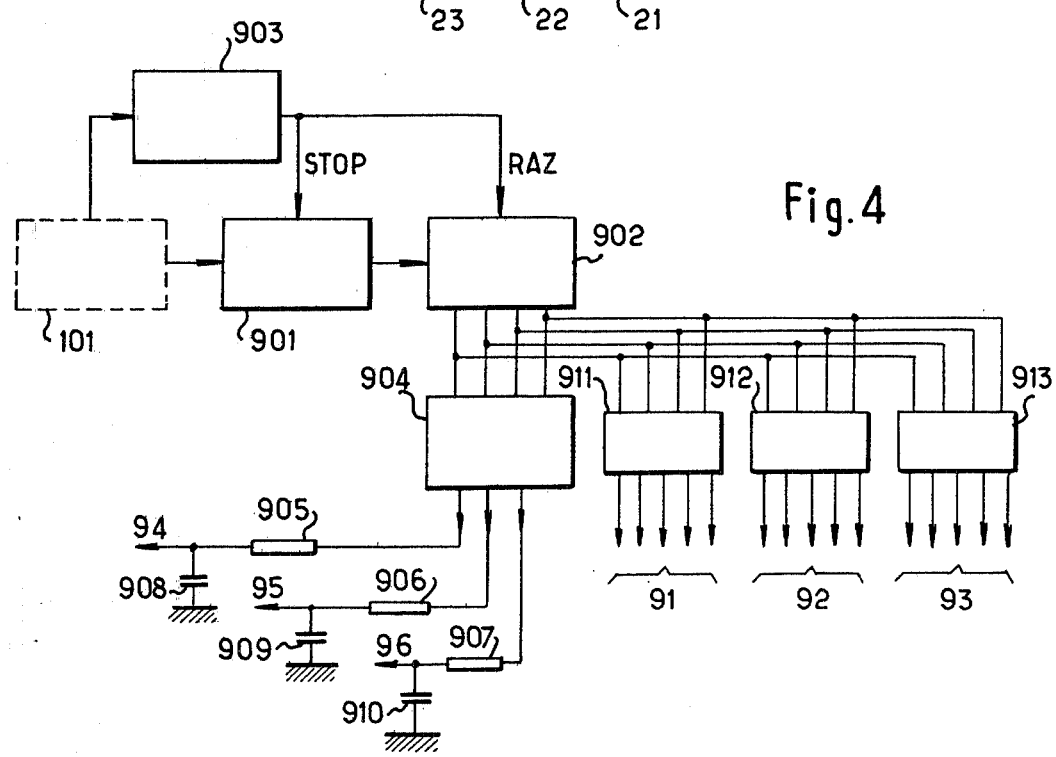
FIG. 4 represents a preferred mode of execution of the programming device.

FIG. 4 shows a preferred mode of execution of programming device 9.

A timer 901, triggered at each cycle by synch generator 101 of the device, supplies impulses which are recorded by a recorder 902, whose output thus supplies a numerical indication of the elapsed time since the emission impulse. A delay device 903 delays the synch impulse for a time slightly less than that of the cycle. This delayed impulse is applied to timer 901 to stop its operation, and to recorder 902 for reset. A program matrix 904, linked to the recorder outputs, feeds the respective inputs 94, 95 and 96 controlling amplifier gains 3 through 5.

This matrix, made, in a known manner, by wired circuit or using dead memory technology, is a programmed decoder, i.e. there is a predetermined relationship between the logic states of its outputs and that of its inputs. For example, this relationship will be such that, during the first recordings of the recorder, only input 94 will not receive any cut-off signal, the gain at amplifier 3 being thus at maximum, whereas amplifiers 4 and 5 will be cut off; during the following recording, amplifiers 4 and 5 only will be in operation; during the following recording, only amplifier 4 will be operating; during the following one, 4 and 5 will be operating, and during the last recordings, 5 only will be operating. The switching-on and cutting-off of each amplifier will be done progressively, i.e. by variation of its gain between the maximum value and a zero value. This programming law, given solely as an example, has the effect of progressively putting into operation elements 21, 22 and 23 of the probe and to progressively remove its focal area at the propagation velocity of the ultrasounds in the considered medium, while avoiding sudden interference-generating switch. Low-pass output filters consisting of resistors 905 through 907 and condensers 908 through 910 ar provided to dampen transitional signals.

The outputs of recorder 902 (figured at 4 bits) are on the other hand linked to three programmed decoders 911 through 913 each having a plurality of outputs marked, in FIG. 1, by a single wire (91, 92 and 93, respectively) leading to the delay devices. These are of the "programmable delay line" type, i.e. each consisting of a plurality of delay elements one or more of which are placed in operation as a function of a numeric control code applied to them. At each recorder status, each of the decoders supplies a predetermined code and one thus obtains a given delay, at any moment, of the echoes transmitted by the element or elements operating at that time. This allows, for each element, a better coincidence between its focal spot and the mobile probed area.

Programming of the decoding memories 904 and 911 through 913 must obviously be done prior to each test or measurement, in order to account for the propagation velocity of the ultrasounds in the medium tested and for the depth of the area to be tested. Depending on the application, it may be preferable to adopt a variation program of the gain amplifiers 3 through 5 different from that given as an example, and not necessarily corresponding to a switching operation.

The programming circuits described are given only for illustrative purposes, since analog controls of gains and delays may be considered.

Should a probe be used having a linear network of elements, one should obviously provide for a delay device and a gain regulation device for the central element, and a delay device and a gain regulating device for each couple of elements symmetric with respect to the central element. Actually, such a couple does the same job as a single element of the ring probe, since its two elements must be associated in order to obtain a focusing effect.

What is claimed is:

1. An ultrasonic pulse echo probing apparatus comprising a high frequency generator for exciting recurrent probing electric pulses, a flat probe including a plurality of piezoelectric transducer elements symmetrical-by mounted with respect to a common axis and integral with a common flat support, said transducer elements being electrically and piezoelectrically insulated from each other and simultaneously energized in parallel by said high-frequency generator, the probe propagating an ultrasonic beam substantially at right angles to said flat support and which transverses a test area and is reflected back to the transducer elements as a receiving beam to provide echo pulses; a plurality of variable-gain amplifier means for amplifying the echo pulses, said amplifier means being respectively connected to the respective transducer elements and each having a gain control input; a plurality of variable delay means serially connected to the respective amplifier means and each having a delay control input; display means, connected to the variable delay means for displaying the amplified and delayed echo pulses provided by the transducer elements and programmable control means, connected to the said gain control inputs and delay control inputs, for varying the respective gains of the variable gain amplifier means and the respective time delays of the variable delay means as a function of the time elapsed from the transmission of each transmitted electric pulse, thereby focalizing the receiving beam at a variable depth within the tested area in synchronism with the propagation of the transmitted pulses within the tested area.

2. A system according to claim 1, in which the connection between the transducer devices and the receiver devices includes delay devices, and means programming said delay devices as a function of the elapsed time from the transmission of each electric impulse.

3. A system according to claim 1, in which said means are variable-gain amplifiers and the programming devices provide progressive switching from one amplifier to the next, by continuous variation of the gain between two predetermined values.

4. In a system according to claim 1, the improvement in which said transducer devices have the shape of concentric rings which are simultaneously energized in parallel by said sender.

5. In a system according to claim 1, the improvement in which the programming devices include a timer generator triggered by the electric impulse sender and supplying timing signals, a recorder having a signal input for said timing signals, and outputs, and programmed decoder devices having respective inputs coupled in parallel to said outputs of said recorder.

* * * * *